(12) United States Patent
Titus (10) Patent No.: US 7,995,314 B2
(45) Date of Patent: Aug. 9, 2011

(54) DEVICES, SYSTEMS, AND METHODS FOR MANAGING A CIRCUIT BREAKER

(75) Inventor: Solomon R. Titus, Cumming, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 348 days.

(21) Appl. No.: 12/204,318

(22) Filed: Sep. 4, 2008

(65) Prior Publication Data

US 2009/0140871 A1    Jun. 4, 2009

Related U.S. Application Data

(60) Provisional application No. 60/991,878, filed on Dec. 3, 2007.

(51) Int. Cl.
*H02H 9/08* (2006.01)
(52) U.S. Cl. .......................................................... 361/42
(58) Field of Classification Search ...................... 361/42
See application file for complete search history.

(56) References Cited

U.S. PATENT DOCUMENTS

| | | | |
|---|---|---|---|
| 3,343,155 A | 9/1967 | Pahlavan | |
| 3,824,581 A | 7/1974 | Ohno | |
| 4,097,857 A | 6/1978 | Miyakawa | |
| 4,351,013 A | 9/1982 | Matsko | |
| 4,429,340 A | 1/1984 | Howell | |
| 4,476,511 A | 10/1984 | Saletta | |
| 4,749,364 A | 6/1988 | Arney | |
| 4,751,605 A | 6/1988 | Mertz | |
| 4,827,369 A | 5/1989 | Saletta | |
| 4,870,531 A | 9/1989 | Danek | |
| 4,945,443 A | 7/1990 | DeBiasi | |
| 4,991,042 A | 2/1991 | Tokarski | |
| 5,089,928 A | 2/1992 | Durivage | |
| 5,204,798 A | 4/1993 | Scott | |
| 5,220,479 A | 6/1993 | Fraisse | |
| 5,426,592 A | 6/1995 | Leone | |
| 5,675,754 A | 10/1997 | King | |
| 6,038,516 A | 3/2000 | Alexander | |
| 6,271,759 B1 | 8/2001 | Weinbach | |
| 6,552,884 B2 | 4/2003 | Kim | |
| 6,798,630 B1 | 9/2004 | Del Vecchio | |
| 7,215,520 B2 | 5/2007 | Elms | |
| 7,301,742 B2 | 11/2007 | Tignor | |
| 2005/0105234 A1 | 5/2005 | McCoy | |
| 2006/0262466 A1* | 11/2006 | Engel | 361/42 |
| 2007/0103835 A1* | 5/2007 | Sorenson | 361/114 |
| 2007/0208520 A1 | 9/2007 | Zhang | |
| 2007/0247768 A1 | 10/2007 | Meehleder | |

* cited by examiner

*Primary Examiner* — Rexford Barnie
*Assistant Examiner* — Scott Bauer
(74) *Attorney, Agent, or Firm* — Jose R. de la Rosa (57) ABSTRACT

Certain exemplary embodiments can provide a fault detection system, which can comprise a circuit breaker that is adapted to protect an electrical circuit. The circuit breaker can comprise a screen adapted to render a user interface. The user interface can comprise an arc fault detection circuit status indicator indicative of an automatic detection of an electrical circuit arc fault by the circuit breaker.

11 Claims, 7 Drawing Sheets

DEVICES, SYSTEMS, AND METHODS FOR MANAGING A CIRCUIT BREAKER

CROSS-REFERENCE TO RELATED APPLICATIONS

This application claims priority to, and incorporates by reference herein in its entirety, pending U.S. Provisional Patent Application Ser. No. 60/991,878, filed 3 Dec. 2007.

BACKGROUND

United States Patent Publication 20050105234 (McCoy), which is incorporated by reference herein in its entirety, discloses that "[c]ertain exemplary embodiments comprise an apparatus comprising, a circuit breaker comprising: an integral thermo-magnetic trip device adapted to trip said circuit breaker upon an occurrence of a current overload; an integral electronic trip device adapted to trip said circuit breaker upon detection of a ground fault and adapted to trip said circuit breaker upon detection of an arc fault; and a trip indicator adapted to visually indicate an occurrence of a trip of only said electronic trip device." See Abstract.

U.S. Pat. No. 7,301,742 (Tignor), which is incorporated by reference herein in its entirety, discloses that "[a]n electronic trip unit for a circuit breaker includes a programmed microprocessor and a module plug in removable signal communication with the microprocessor. The module plug includes a program identifier. The microprocessor recognizes the program identifier and accesses a program of a plurality of programs external to the module plug based on the program identifier. The microprocessor responds to the program to perform a function identified by the module plug. The function identifiable by the module plug includes a communications function, a load monitoring function, a non-tripping ground fault alarm function, a flag function, or any combination thereof." See Abstract.

U.S. Pat. No. 6,798,630 (Del Vecchio), which is incorporated by reference herein in its entirety, discloses that "[t]he electronic trip device includes a processing unit having inputs to receive electrical signals representative of electrical quantities and an output to supply a tripping signal to a tripping relay, and a man-machine interface connected to the processing unit to supply setting parameters and to display information and tripping curves on a screen. The man-machine interface includes display means displaying setting parameters which modify the visual aspect of at least one portion of curve representative of a parameter whose setting is being adjusted. The circuit breaker includes such a trip device connected to current sensors and to contacts to interrupt currents in electrical conductors." See Abstract.

SUMMARY

Certain exemplary embodiments can provide a fault detection system, which can comprise a circuit breaker that is adapted to protect an electrical load. The circuit breaker can comprise a screen adapted to render a user interface. The user interface can comprise an arc fault detection circuit status indicator indicative of an automatic detection of an electrical circuit arc fault by the circuit breaker.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide a fault detection system, which can comprise a circuit breaker that is adapted to protect an electrical load. The circuit breaker can comprise a screen adapted to render a user interface. The user interface can comprise an arc fault detection circuit status indicator indicative of an automatic detection of an electrical circuit arc fault by the circuit breaker.

Certain exemplary embodiments can display circuit breaker parameters, power service parameters, and/or a current status of working conditions of an electronic system contained within the circuit breaker. The display can utilize a liquid crystal display (LCD) screen located on a front of a circuit breaker housing.

Certain exemplary embodiments can monitor and/or provide an electronic display that is adapted to show circuit breaker parameters, service parameters, and/or a current status of an electronic system contained within the circuit breaker. The display of information can be automatically updated as the circuit breaker parameters are updated and/or if one or more characteristics of the electronic system changes. The LCD can be used to determine whether the circuit breaker is working properly. The display can be a LCD screen, which can be located on the front of the circuit breaker.

Certain exemplary embodiments can be adapted to assist in diagnosing one or more problems of a circuit breaker and/or a system associated with the circuit breaker that is not working properly. Certain exemplary embodiments can monitor circuit breaker parameters, service conditions, and/or a status of circuit breaker electronics. Certain exemplary embodiments can identify a circuit breaker that is not working according to designed parameters. Information can be displayed on a LCD that can be read. For example, parameters can be rendered such as 120 volts, 15 amps, etc.

Certain exemplary embodiments can render technical information on the front of the circuit breaker. Rendered technical information can be used to identify a circuit breaker that is or is not working properly in a panel.

Certain exemplary embodiments can comprise an arc fault circuit interrupter (AFCI) circuit and/or one and/or two pole residential circuit breakers that include an electronic circuit board. The LCD can be located on the front side of the circuit breaker and can be connected to a printed circuit board such as by a ribbon cable conductor and/or a wireless transceiver. Certain exemplary embodiments can utilize AFCI and/or ground fault circuit interrupter (GFCI) protection and can include thermal/magnetic protection and/or electronic components used to trip the circuit breaker. Certain exemplary embodiments can provide a visual display of the key circuit breaker parameters, service parameters, and/or working condition of electronic circuitry associated with the circuit breaker. Certain exemplary embodiments can be adapted to identify a circuit breaker that is working properly and/or not working properly.

Figure 1:
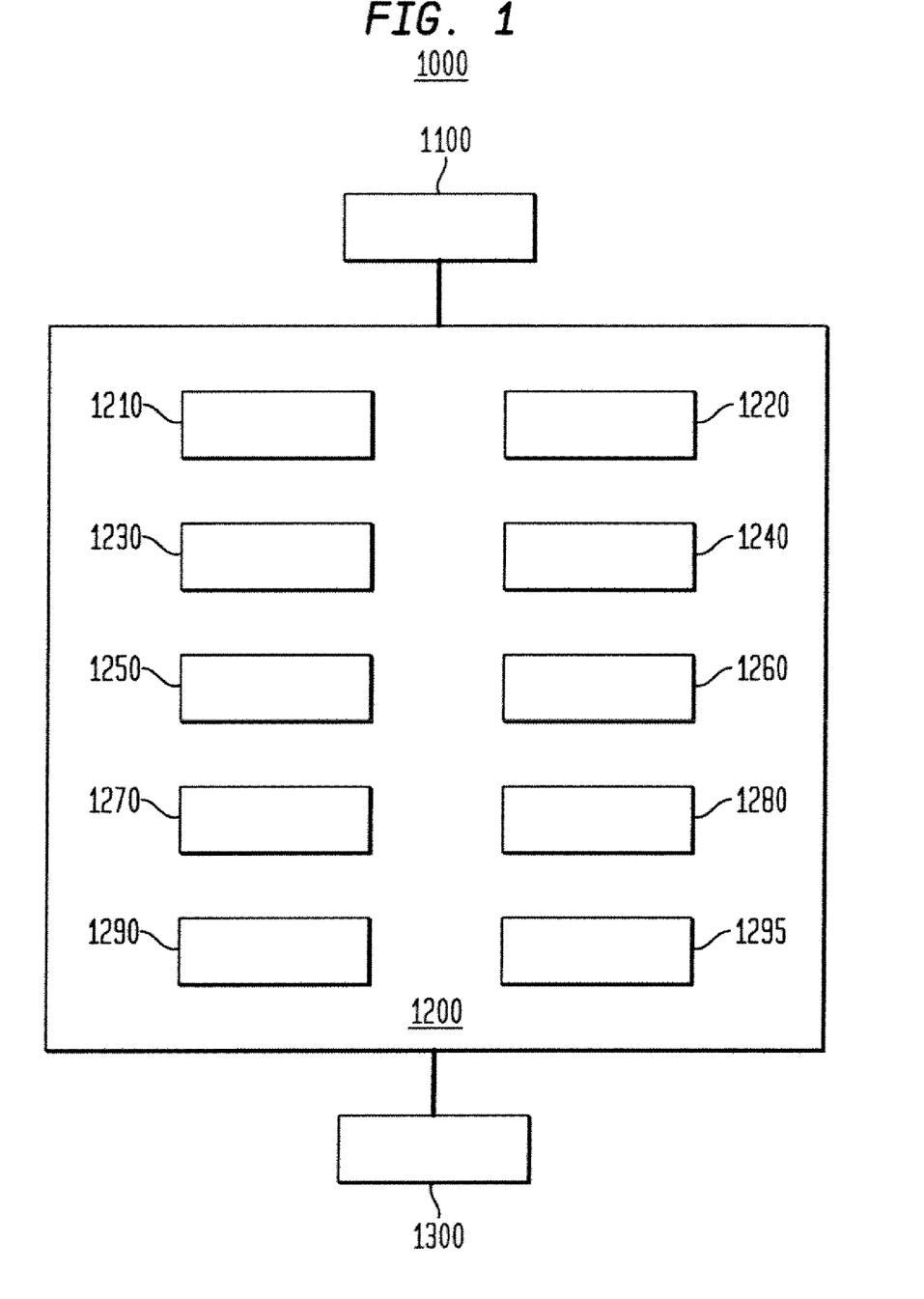
FIG. 1 is a block diagram of an exemplary embodiment of a system 1000.

FIG. 1 is a block diagram of an exemplary embodiment of a system 1000, which can comprise an electrical energy source 1100, a circuit breaker system 1200, and an electrical circuit such as an electrical load 1300. Energy source 1100 can comprise and/or be electrically coupled to electrical conductors to which electrical energy is conducted from a utility. Energy source 1100 can comprise and/or be communicatively coupled to one or more generators of electrical energy such as a turbine. Circuit breaker system 1200 can be electrically coupled to energy source 1100 by one or more electrical conductors. Circuit breaker system 1200 can be adapted to provide electrical energy to electrical load 1300 and/or reduce a probability of damage thereto that might be caused by electrical energy having parameters that exceed one or more thresholds.

In certain exemplary embodiments, circuit breaker system 1200 can comprise:
 a circuit breaker test button 1210, which can be adapted to activate a circuit breaker test circuit 1220;
 circuit breaker test circuit 1220, which can be adapted to simulate a predetermined fault in electrical energy, electrical load 1300, and/or circuit breaker system 1200;
 a kilowatt hour monitoring circuit 1230, which can be adapted to provide information to a kilowatt-hour status indicator 1240;
 kilowatt-hour status indicator 1240, which can be indicative of electrical energy use in an electrical circuit during a predetermined time interval;
 a power service detection circuit 1250, which can be adapted to provide information to a power service status indicator 1260;
 a wireless transceiver 1270, which can be adapted to communicate signals between a touch screen 1280 and one or more other components comprised by circuit breaker system 1200;
 a power service status indicator 1290, which can be indicative of an ability of circuit breaker system 1200 to transmit electrical energy through the electrical circuit; and/or;
 a microprocessor 1295, which can be adapted to process signals, data, and/or commands received from touch screen 1280; etc.

In certain exemplary embodiments, one or more of kilowatt-hour status indicator 1240 and/or power service status indicator 1260 can be comprised by and/or rendered via touch screen 1280.

Figure 2:
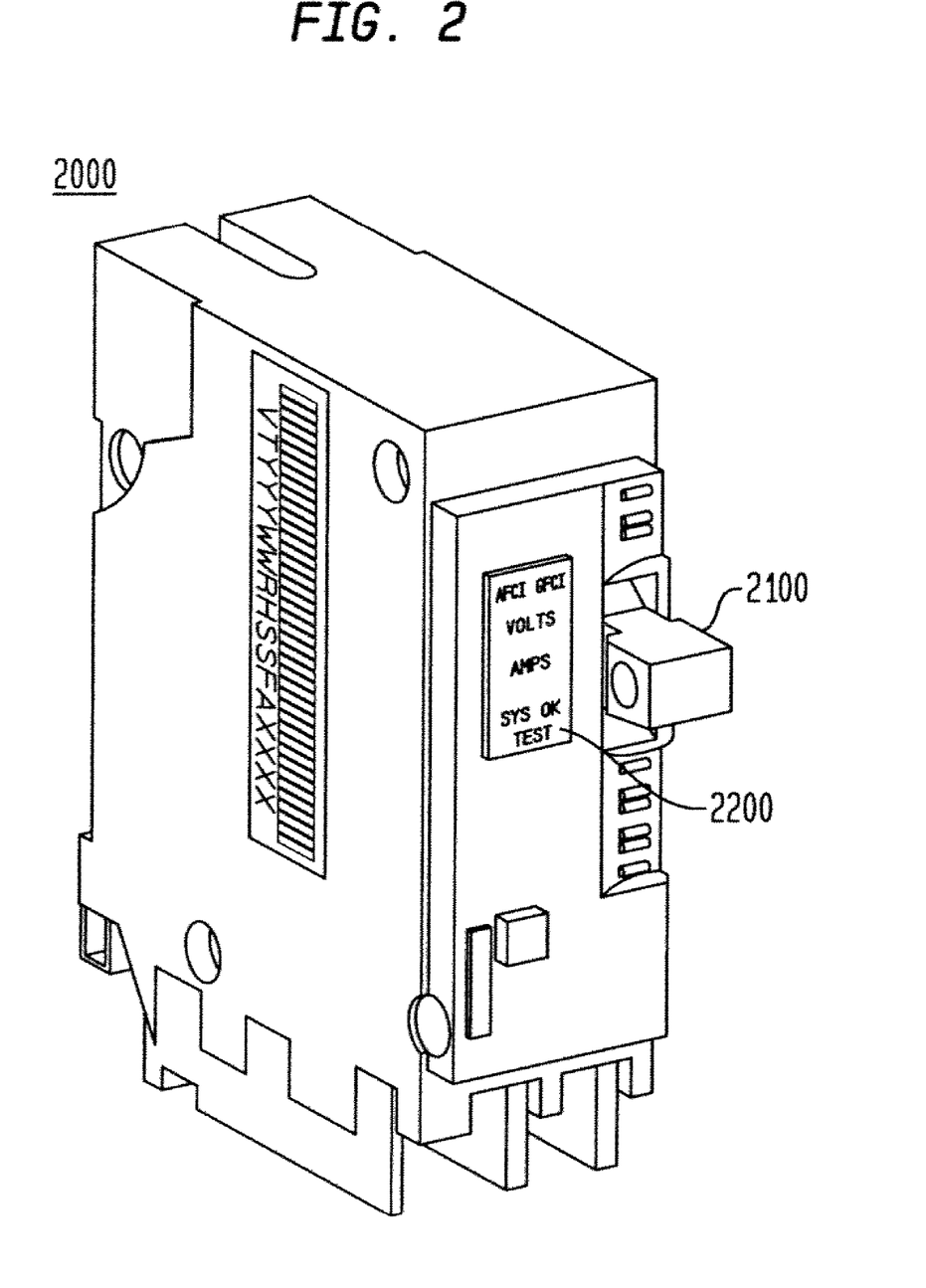
FIG. 2 is a perspective view of an exemplary embodiment of a circuit breaker system 2000.

FIG. 2 is a perspective view of an exemplary embodiment of a circuit breaker system 2000, which can comprise a circuit breaker handle 2100 and a user interface 2200. A position of circuit breaker handle 2100 can be indicative of whether electrical energy is flowing through system 2000 and/or to an electrical load electrically coupled to system 2000. User interface 2200 can be adapted to render information regarding circuit breaker system 2000 and/or an electrical load coupled thereto.

Figure 3:
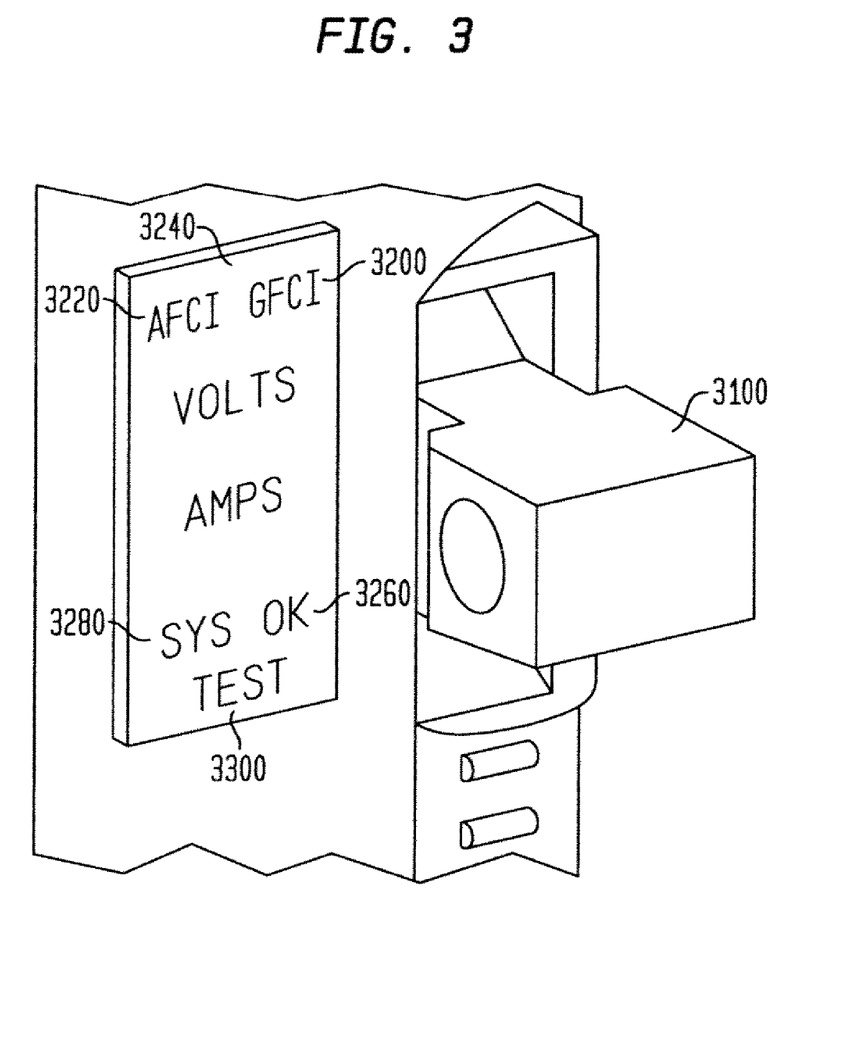
FIG. 3 is a perspective view of an exemplary embodiment of a circuit breaker system 3000.

FIG. 3 is a perspective view of an exemplary embodiment of a circuit breaker system 3000, which can comprise a circuit breaker handle 3100 and a user interface 3200. A position of circuit breaker handle 3100 can be indicative of whether electrical energy is flowing through circuit breaker system 3000 and/or to an electrical load electrically coupled to system 3000. User interface 3200 can be adapted to render information regarding the electrical load and/or circuit breaker system 3000. For example, user interface 3200 can comprise information regarding a status of an AFCI and/or a GFCI function. User interface 3200 can be adapted to render an electrical current and/or voltage flowing through circuit breaker system 3000. User interface 3200 can be adapted to render information regarding a status of circuit breaker circuit breaker system 3000 and/or a test thereof.

In certain exemplary embodiments, user interface 3200 can be a touch screen adapted to be communicatively coupled to a circuit breaker of circuit breaker system 3000. Circuit breaker system 3000 can be is adapted to protect an electrical load. The user interface can comprise:
 an arc fault detection circuit status indicator 3220, which can be indicative of an automatic detection of an arc fault by circuit breaker system 3000 in the electrical circuit, the arc fault status indicator can render information provided by the arc fault detection circuit;
 a ground fault detection circuit status indicator 3240, which can be indicative of an automatic detection of a ground fault by the circuit breaker in the electrical circuit, the ground fault status indicator can render information provided by the ground fault detection circuit;
 an overload status indicator 3260, which can be indicative of an automatic detection of an overload by circuit breaker system 3000 in the electrical circuit;
 a circuit breaker status indicator 3280, which can be adapted to indicate a status of circuit breaker system 3000; and/or
 a circuit breaker test button 3300, which can be adapted to, upon activation, cause a predetermined fault to be simulated in the electrical circuit served by circuit breaker system 3000; etc.

Figure 4:
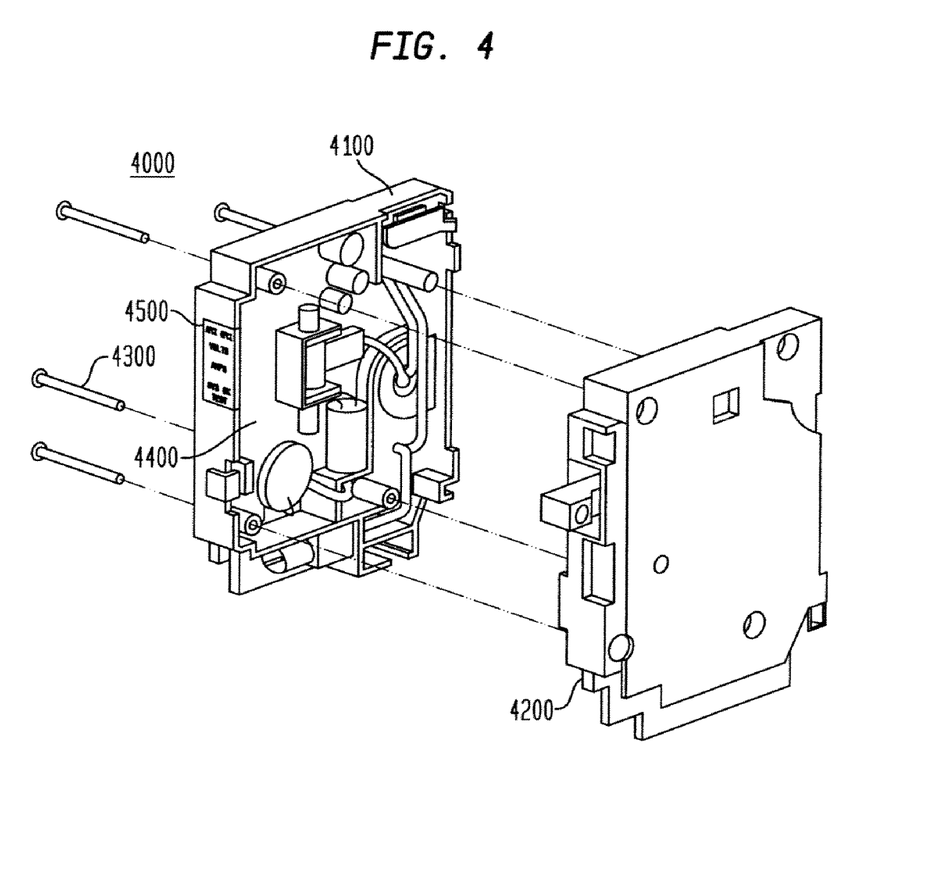
FIG. 4 is a perspective view of an exemplary embodiment of a circuit breaker system 4000.

FIG. 4 is a perspective view of an exemplary embodiment of a circuit breaker system 4000, which can comprise a first circuit breaker portion 4100 and a second circuit breaker portion 4200. First circuit breaker portion 4100 and second circuit breaker portion 4200 can be mechanically coupled via a set of fasteners 4300. First circuit breaker portion 4100 can be adapted to operatively house a circuit board 4400, which can be communicatively coupled to a user interface 4500.

Figure 5:
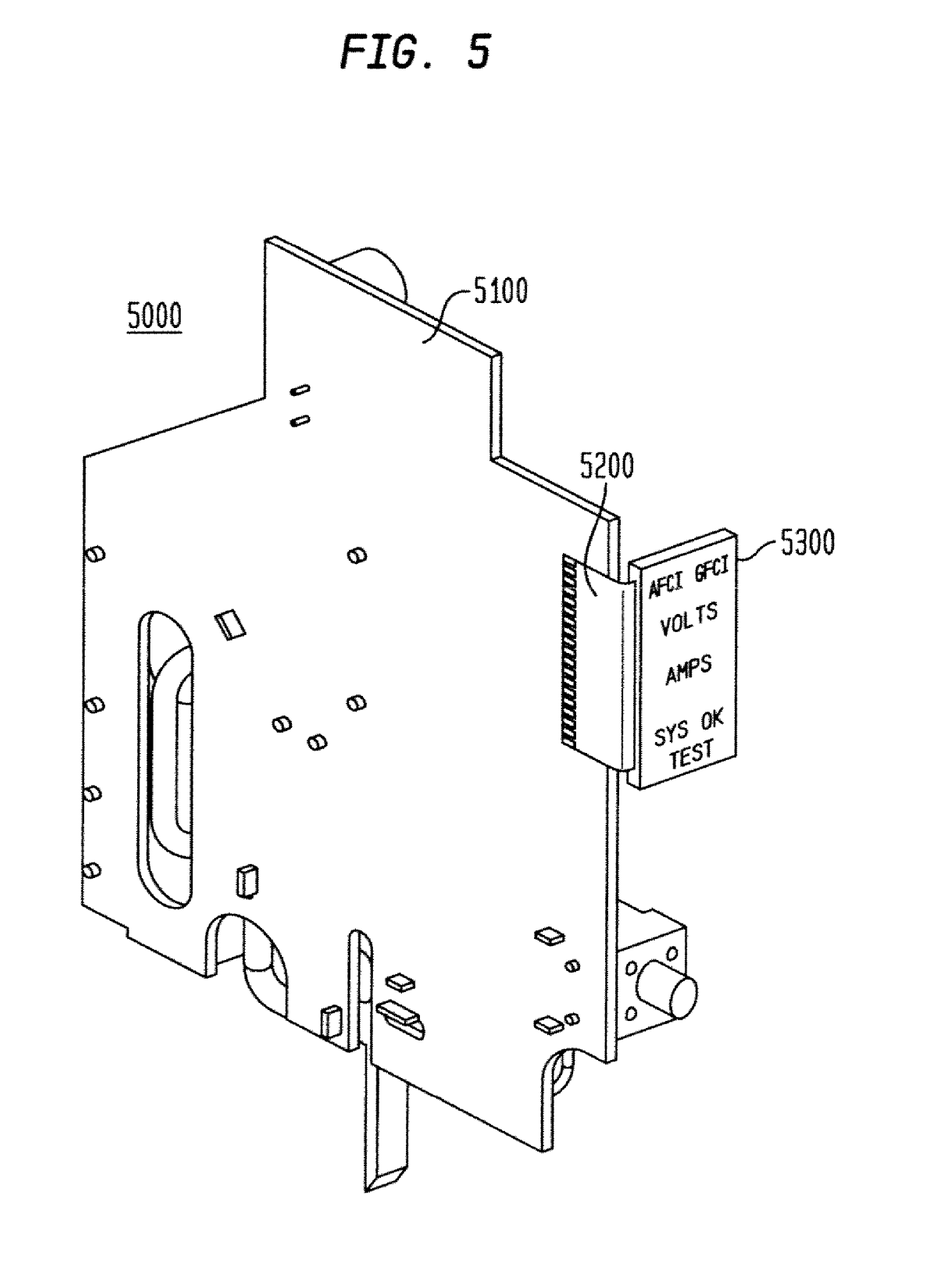
FIG. 5 is a perspective view of an exemplary embodiment of a circuit breaker system 5000.

FIG. 5 is a perspective view of an exemplary embodiment of a circuit breaker system 5000, which can comprise a printed circuit board 5100, a cable 5200, and a user interface 5300. User interface 5300 can be communicatively coupled to printed circuit board 5100 via cable 5200. Cable 5200 can be a ribbon cable. User interface 5300 can be adapted to render measured values and/or status information regarding a circuit breaker and/or an electrical load electrically coupled to circuit breaker system 5000.

Figure 6:
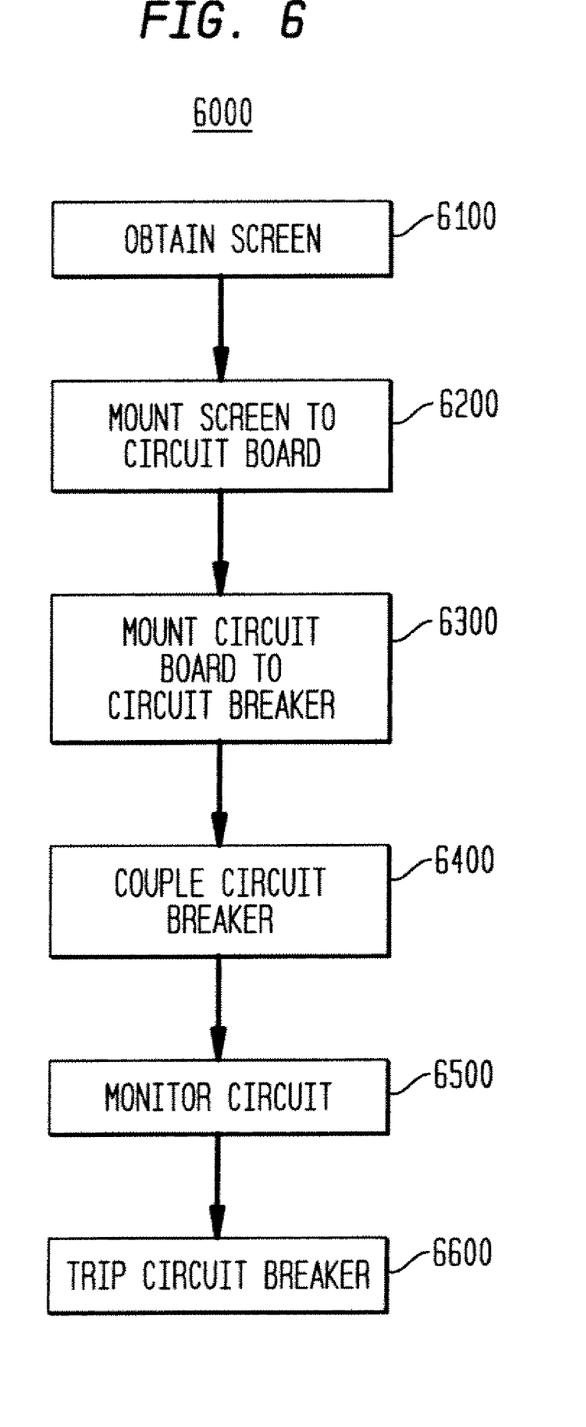
FIG. 6 is a flowchart of an exemplary embodiment of a method 6000.

FIG. 6 is a flowchart of an exemplary embodiment of a method 6000. One or more activities of method 6000 can be performed automatically and/or via machine-implementable instructions stored on a machine-readable medium. At activity 6100, a screen adapted for use as a user interface can be obtained. The screen can be obtained and/or manufactured in accordance with specifications of a circuit breaker and can comply with one or more industry and/or government standards.

At activity 6200, the screen can be mounted to a circuit board. The screen can be electrically and/or communicatively coupled to the circuit board via a ribbon cable. In certain exemplary embodiments, the screen can be communicatively coupled to the circuit board and/or a microprocessor associated with the circuit breaker via wireless transceiver.

At activity 6300, the circuit board can be mounted to a circuit breaker. For example, the circuit board can be mechanically mounted to the circuit breaker via one or more fasteners. One or more components of the circuit board can be adapted to monitor an electrical circuit and/or cause the circuit breaker to trip responsive to one or more conditions. For example, the circuit breaker can trip due to a thermal overload, a detected arc fault condition, a detected ground fault condition, a detected excessive electrical voltage, an excessive electrical current, and/or an excessive temperature, etc.

At activity 6400, the circuit breaker can be electrically coupled to an electric circuit. The circuit breaker can be adapted to attempt to prevent damage to the electric circuit caused by one or more electrical conditions.

At activity 6500, the circuit breaker can be adapted to monitor one or more characteristics of electrical energy flowing to the electric circuit. Certain exemplary embodiments can be adapted to cause a user interface to render a plurality of elements. The user interface can be adapted to communicatively couple with a circuit breaker that is adapted to protect and/or prevent damage to an electrical circuit. The elements can comprise:

- an arc fault detection circuit status indicator, which can be indicative of an automatic detection of an arc fault by the circuit breaker in the electrical circuit;
- a ground fault detection circuit status indicator, which can be indicative of an automatic detection of a ground fault by the circuit breaker in the electrical circuit;
- an overload status indicator, which can be indicative of an automatic detection of an overload by the circuit breaker in the electrical circuit;
- a circuit breaker status indicator adapted to indicate a status of the circuit breaker;
- a circuit breaker test button, which can be adapted to, upon activation, simulate a fault in the electrical circuit served by the circuit breaker;
- a kilowatt-hour status indicator, which can be indicative of electrical energy use in the electrical circuit during a predetermined time interval; and/or
- a power service status indicator, which can be indicative of an ability of the circuit breaker to transmit electrical energy through the electrical circuit; etc.

At activity 6600, the circuit breaker can be tripped. The circuit breaker can be tripped via one or more of an arc fault, a ground fault, an electrical overload, a short, an exceedance of a predetermined threshold by a measured electrical parameter (e.g., voltage, current, and/or frequency, etc.) and/or an exceedance of a predetermined temperature within the circuit breaker, etc.

Figure 7:
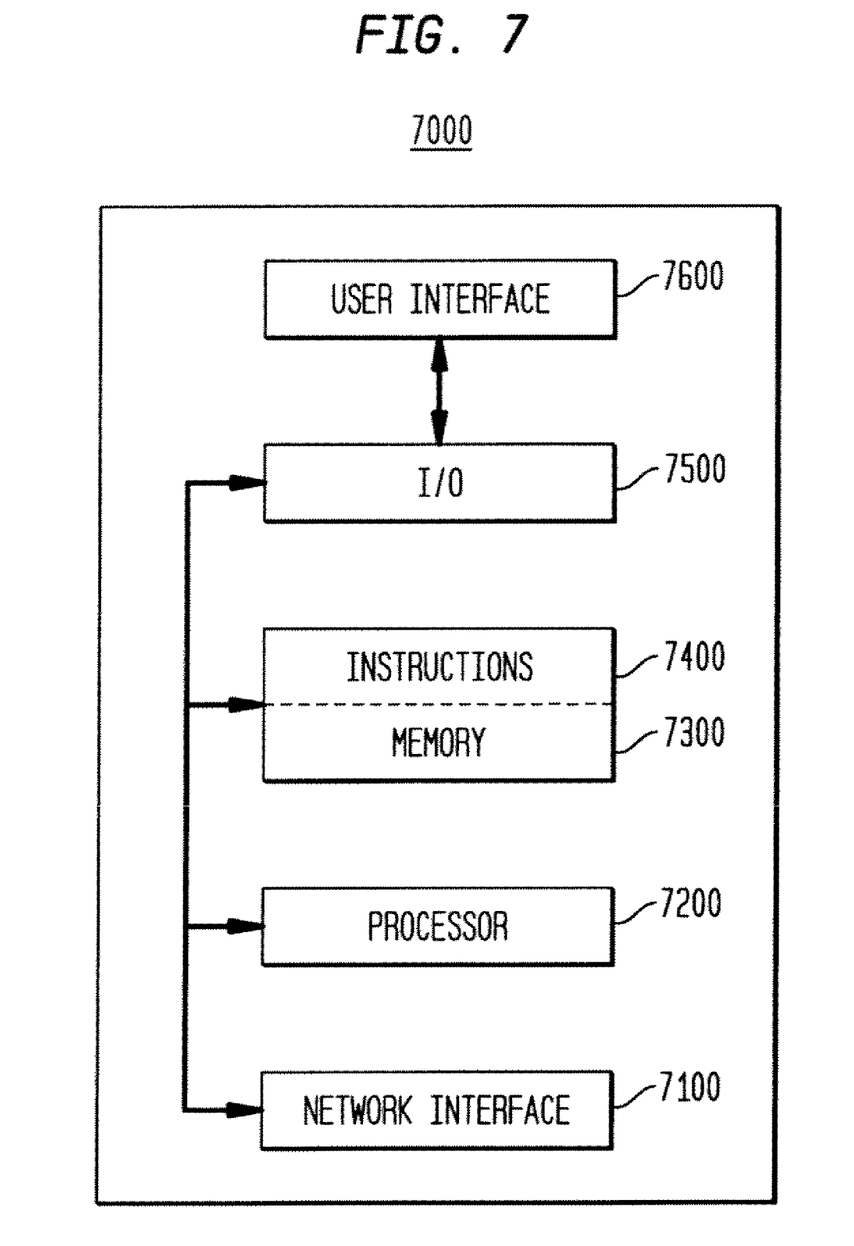
FIG. 7 is a block diagram of an exemplary embodiment of an information device 7000.

FIG. 7 is a block diagram of an exemplary embodiment of an information device 7000, which in certain operative embodiments can comprise, for example, an information device embodied in circuit breaker system 5000 of FIG. 5. Information device 7000 can comprise any of numerous circuits and/or components, such as for example, one or more network interfaces 7100, one or more processors 7200, one or more memories 7300 containing instructions 7400, one or more input/output (I/O) devices 7500, and/or one or more user interfaces 7600 coupled to I/O device 7500, etc.

In certain exemplary embodiments, via one or more user interfaces 7600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

accept—receive.

activity—an action, act, deed, function, step, and/or process and/or a portion thereof.

activate—to actuate and/or set in motion and/or action.

adapted to—suitable, fit, and/or capable of performing a specified function.

and/or—either in conjunction with or in alternative to.

arc fault—a discharge of electricity between two or more conductors, the discharge associated with at least a predetermined voltage, current, and/or power level.

associate—to relate, bring together in a relationship, map, combine, join, and/or connect.

automatically—acting or operating in a manner essentially independent of external influence or control. For example, an automatic light switch can turn on upon "seeing" a person in its view, without the person manually operating the light switch.

can—is capable of, in at least some embodiments.

cause—to bring about, provoke, precipitate, produce, elicit, be the reason for, result in, and/or effect.

circuit—an electrically conductive pathway and/or a communications connection established across two or more switching devices comprised by a network and between corresponding end systems connected to, but not comprised by the network.

circuit breaker—a re-settable device adapted to automatically open an alternating current electrical circuit to protect the circuit from damage caused by overload and/or short circuit.

command—a signal that initiates an operation defined by an instruction.

comprising—including but not limited to, what follows.

communicatively couple—to link in a manner that facilitates communications.

configure—to design, arrange, set up, shape, and/or make suitable and/or fit for a specific purpose.

couple—to join, connect, and/or link two things together.

create—to make, form, produce, generate, bring into being, and/or cause to exist.

data—information represented in a form suitable for processing by an information device.

define—to establish the meaning, relationship, outline, form, and/or structure of; and/or to precisely and/or distinctly describe and/or specify.

detection—an act of sensing or perceiving.

determine—to obtain, calculate, decide, deduce, establish, and/or ascertain.

device—a machine, manufacture, and/or collection thereof.

display—(v.) to visually render. (n.) an electronic device that represents information in visual form and/or a visual representation of something.

during—at some time in a time interval.

each—every one of a group considered individually.

electrical—relating to producing, distributing, and/or operating by electricity.

electrical energy—energy characterized by the flow of electric charge through a conductor.

electrically—of, relating to, producing, or operated by electricity.

electrically coupled—connected in a manner adapted to allow a flow of electricity therebetween.

element—a component of a user interface.

exterior—a region that is outside of a device and/or system.

fault—an undesired and/or dysfunctional system state and/or an imperfection, defect, error, and/or discrepancy.

further—in addition.

generate—to create, produce, render, give rise to, and/or bring into existence.

ground fault—a shorting of an electrical device or circuit to ground.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

indicative—serving to indicate.

indicator—one or more signs, tokens, symbols, signals, devices, and/or substance that indicates.

information—facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information.

information device—any device on which resides a finite state machine capable of implementing at least a portion of a method, structure, and/or or graphical user interface described herein. An information device can comprise well-known communicatively coupled components, such as one or more network interfaces, one or more processors, one or more memories containing instructions, one or more input/output (I/O) devices, and/or one or more user interfaces (e.g., coupled to an I/O device) via which information can be rendered to implement one or more functions described herein. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), iPod, mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc.

input—a signal, data, and/or information provided to a processor, device, and/or system.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

interface—(n) a boundary across which two independent systems meet and act on and/or communicate with each other. (v) to connect with and/or interact with by way of an interface.

kilowatt hour status—a state and/or condition regarding a quantity of electrical energy consumed by a predetermined user during a predetermined time period.

liquid crystal display (LCD)—a rendering system that uses liquid crystal cells that change reflectivity in an applied electric field.

machine implementable instructions—directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine-readable medium—a physical structure from which a machine, such as an information device, computer, microprocessor, and/or controller, etc., can obtain and/or store data, information, and/or instructions. Examples include memories, punch cards, and/or optically-readable forms, etc.

may—is allowed and/or permitted to, in at least some embodiments.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

microprocessor—a device adapted to perform one or more predetermined tasks, such as acting upon information by manipulating, analyzing, modifying, converting, transmitting the information for use by an executable procedure and/or an information device, and/or routing the information to an output device. A microprocessor can be a central processing unit, a local controller, a remote controller, parallel controller, and/or distributed controller, etc. The microprocessor can be a general-purpose microcontroller, such the Pentium IV series of microprocessor manufactured by the Intel Corporation of Santa Clara, Calif. In another embodiment, the microprocessor can be an Application Specific Integrated Circuit (ASIC) or a Field Programmable Gate Array (FPGA) that has been designed to implement in its hardware and/or firmware at least a part of an embodiment disclosed herein.

monitor—(n.) a device and/or system adapted to systematically check, test, and/or sample for the purpose of evaluating a metric related to the performance of a device and/or system; (v.) to observe.

more—in addition to.

mount—(n) that upon which a thing is attached. (v) to couple, fix, and/or attach on and/or to something.

network—a communicatively coupled plurality of nodes, communication devices, and/or information devices. Via a network, such devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, and/or one or more information devices, such as a switch, router, and/or gateway not directly connected to a local area network, etc., and/or any equivalents thereof.

network interface—any physical and/or logical device, system, and/or process capable of coupling an information device to a network. Exemplary network interfaces comprise a telephone, cellular phone, cellular modem, telephone data modem, fax modem, wireless transceiver, Ethernet card, cable modem, digital subscriber line interface, bridge, hub, router, or other similar device, software to manage such a device, and/or software to provide a function of such a device.

one—a single unit.

operative—being in effect; operating.

overload—an amplitude (such as of a current, voltage, and/or temperature, etc.) above a specified limit of a device and/or system.

perform—to begin, take action, do, fulfill, accomplish, carry out, and/or complete, such as in accordance with one or more criterion.

plurality—the state of being plural and/or more than one.

processor—a hardware, firmware, and/or software machine and/or virtual machine comprising a set of machine-readable instructions adaptable to perform a specific task. A processor can utilize mechanical, pneumatic, hydraulic, electrical, magnetic, optical, informational, chemical, and/or biological principles, mechanisms, signals, and/or inputs to perform the task(s). In certain embodiments, a processor can act upon information by manipulating, analyzing, modifying, and/or converting it, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

power—energy, a measure of energy and/or work, and/or a rate at which work is done, expressed as the amount of work per unit time and commonly measured in units such as watt and horsepower.

power service status—a state and/or condition regarding whether a circuit is operatively transmitting electrical energy to a user.

predetermined—determine, decide, or establish in advance.

printed circuit board—a thin substantially planar board to which electronic components are fixed, typically by solder. Component leads and integrated circuit pins may pass through holes ("vias") in the board or they may be surface mounted, in which case no holes are required (although they may still be used to interconnect different layers of the board).

process—(n.) an organized series of actions, changes, and/or functions adapted to bring about a result. (v.) to perform mathematical and/or logical operations according to programmed instructions in order to obtain desired information and/or to perform actions, changes, and/or functions adapted to bring about a result.

processor—a hardware, firmware, and/or software machine and/or virtual machine comprising a set of machine-readable instructions adaptable to perform a specific task. A processor can utilize mechanical, pneumatic, hydraulic, electrical, magnetic, optical, informational, chemical, and/or biological principles, mechanisms, signals, and/or inputs to perform the task(s). In certain embodiments, a processor can act upon information by manipulating, analyzing, modifying, and/or converting it, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

provide—to furnish, supply, give, convey, send, and/or make available.

real-time—substantially contemporaneous to a current time. For example, a real-time transmission of information can be initiated and/or completed within about 120, 60, 30, 15, 10, 5, and/or 2, etc. seconds of receiving a request for the information.

receive—to obtain, take, and/or acquire.

render—to display, annunciate, speak, print, and/or otherwise make perceptible to a human, for example as data, commands, text, graphics, audio, video, animation, and/or hyperlinks, etc., such as via any visual, audio, and/or haptic mechanism, such as via a display, monitor, printer, electric paper, ocular implant, cochlear implant, speaker, etc.

request—(v.) to express a need and/or desire for; to inquire and/or ask for. (n.) that which communicates an expression of desire and/or that which is asked for.

responsive—reacting to an influence and/or impetus.

ribbon cable—a group of attached substantially parallel electrically conductive wires arranged side by side and fastened together by a cohesion process to form a flexible system.

said—when used in a system or device claim, an article indicating a subsequent claim term that has been previously introduced.

select—to make and/or indicate a choice and/or selection from among alternatives.

serve—to be used by.

service—useful work that does not produce a tangible commodity, work done for the benefit others, and/or a performance of work and/or duties.

signal—information encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal can be synchronous, asynchronous, hard real-time, soft real-time, non-real time, continuously generated, continuously varying, analog, discretely generated, discretely varying, quantized, digital, continuously measured, and/or discretely measured, etc.

simulate—to create as a representation or model of another thing.

status—a state and/or condition and/or information related thereto.

store—to place, hold, retain, enter, and/or copy into and/or onto a machine-readable medium.

substantially—to a considerable, large, and/or great, but not necessarily whole and/or entire, extent and/or degree.

surface—the outer boundary of an object or a material layer constituting or resembling such a boundary.

system—a collection of mechanisms, devices, machines, articles of manufacture, processes, data, and/or instructions, the collection designed to perform one or more specific functions.

test—evaluate.

through—in one side and out another side of.

time—a measurement of a point in a nonspatial continuum in which events occur in apparently irreversible succession from the past through the present to the future.

time interval—a quantity and/or finite amount of time between two specified instants, events, and/or states.

touch screen—an interactive visual display device, having a display area adapted to visibly render text, icons, images, and/or symbols, the device adapted to detect and interpret touches, applied directly by a user and/or via a stylus, pen, or the like, within the display area as an input of data and/or commands adapted to cause implementation by a machine, such as an information device, of machine instructions to perform one or more predetermined functions.

transceiver—a device adapted to transmit and/or receive signals.

transmit—to provide, furnish, supply, send as a signal, and/or to convey (e.g., force, energy, and/or information) from one place and/or thing to another.

transmitter—an electronic device that generates and radiates a meaningful signal electronically and/or via electromagnetic waves.

use—consumption.

user—a person, organization, process, device, program, protocol, and/or system that uses a device, system, process, and/or service.

user interface—a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

verify—to test accuracy.

via—by way of and/or utilizing.

visible—a state, for a node, of being viewable by a user.

wireless—any communication technique that transmits a signal that does not require the use of a wire and/or guide connecting a transmitter and a receiver and/or utilizes electromagnetic waves emitted by an antenna (i.e., via an unguided medium), including such communication techniques as sonar, radio, cellular, cellular radio, digital cellular radio, ELF, LF, MF, HF, VHF, UHF, SHF, EHF, radar, microwave, satellite microwave, laser, infrared, etc., but excluding purely visual signaling, such as semaphore, smoke signals, sign language, etc., the communication technique having a baseband and/or carrier frequency ranging from about 1 Hz to about $2 \times 10^{14}$ Hz (about 200 teraHertz), including all values therebetween, such as for example, about 40 Hz, 6.010 kHz, 8.7 MHz, 4.518 GHz, 30 GHz, etc. and including all subranges therebetween, such as for example, from about 100 kHz to about 100 MHz, about 30 MHz to about 1 GHz, about 3 kHz to about 300 GHz, etc. Wireless communications can include analog and/or digital data, signals, and/or transmissions. Wireless communication can be via any of a plurality of protocols such as, for example, cellular CDMA, TDMA, GSM, GPRS, UMTS, W-CDMA, CDMA2000, TD-CDMA, 802.11a, 802.11b, 802.11g, 802.15.1, 802.15.4, 802.16, and/or Bluetooth, etc.

wireless transmitter—a device adapted to transfer a signal from a source to a destination without the use of wires.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive.

What is claimed is:

1. A fault detection system comprising:
    a touch screen mounted on a first portion of a circuit breaker and adapted to communicatively and mechanically couple with the circuit breaker that is adapted to protect an electrical circuit comprising an electrical load, said touch screen adapted to render a user interface comprising:
        an arc fault detection circuit status indicator indicative of an automatic detection of an arc fault by said circuit breaker in said electrical circuit;
        a ground fault detection circuit status indicator indicative of an automatic detection of a ground fault by said circuit breaker in said electrical circuit;
        an overload status indicator indicative of an automatic detection of an overload by said circuit breaker in said electrical circuit;
        a circuit breaker status indicator adapted to indicate a status of said circuit breaker;
        a circuit breaker test button adapted to, upon activation, cause a predetermined fault to be simulated in said electrical circuit served by said circuit breaker;
        a kilowatt-hour status indicator indicative of electrical energy use in said electrical circuit during a predetermined time interval; and
        a power service status indicator indicative of whether the electrical circuit is operatively transmitting electrical energy to a user.

2. The system of claim 1, further comprising:
    said circuit breaker.

3. The system of claim 1, further comprising:
    said arc fault detection circuit.

4. The system of claim 1, further comprising:
    said ground fault detection circuit.

5. The system of claim 1, further comprising:
a circuit breaker test circuit adapted to simulate said predetermined fault.

6. The system of claim 1, further comprising:
a kilowatt hour monitoring circuit adapted to provide information to said kilowatt-hour status indicator.

7. The system of claim 1, further comprising:
a power service detection circuit adapted to provide information to said power service status indicator.

8. The system of claim 1, further comprising:
a wireless transceiver adapted to communicate signals between said touch screen and said circuit breaker.

9. The system of claim 1, further comprising:
a microprocessor adapted to process signals, data, and/or commands ands received from said touch screen.

10. A method comprising:
mounting a touch screen to a circuit board;
mounting the circuit board to the circuit breaker;
causing the touch screen to render a plurality of elements on a first portion of the circuit breaker, said touch screen adapted to communicatively couple with a circuit breaker that is adapted to protect an electrical circuit comprising an electrical load, said elements comprising:
　an arc fault detection circuit status indicator indicative of an automatic detection of an arc fault by said circuit breaker in said electrical circuit;
　a ground fault detection circuit status indicator indicative of an automatic detection of a ground fault by said circuit breaker in said electrical circuit;
　an overload status indicator indicative of an automatic detection of an overload by said circuit breaker in said electrical circuit;
　a circuit breaker status indicator adapted to indicate a status of said circuit breaker;
　a circuit breaker test button adapted to, upon activation, simulate a fault in said electrical circuit served by said circuit breaker;
　a kilowatt-hour status indicator indicative of electrical energy use in said electrical circuit during a predetermined time interval; and
　a power service status indicator indicative of whether an electrical circuit is operatively transmitting electrical energy to a user.

11. A non-transitory machine-readable medium comprising non-transitory machine implementable instructions for activities comprising:
causing a user interface mounted to a first portion of a circuit breaker to render a plurality of elements, said user interface adapted to be communicatively and mechanically coupled to a circuit breaker that is adapted to protect an electrical circuit comprising an electrical load, said elements comprising:
　an arc fault detection circuit status indicator indicative of an automatic detection of an arc fault by said circuit breaker in said electrical circuit;
　a ground fault detection circuit status indicator indicative of an automatic detection of a ground fault by said circuit breaker in said electrical circuit;
　an overload status indicator indicative of an automatic detection of an overload by said circuit breaker in said electrical circuit;
　a circuit breaker status indicator adapted to indicate a status of said circuit breaker;
　a circuit breaker test button adapted to, upon activation, simulate a fault in said electrical circuit served by said circuit breaker;
　a kilowatt-hour status indicator indicative of electrical energy use in said electrical circuit during a predetermined time interval; and
　a power service status indicator indicative of whether an electrical circuit is operatively transmitting electrical energy to a user.

* * * * *